US 8,447,857 B2

(12) United States Patent
Exton et al.

(10) Patent No.: US 8,447,857 B2
(45) Date of Patent: May 21, 2013

(54) TRANSFORMING HTTP REQUESTS INTO WEB SERVICES TRUST MESSAGES FOR SECURITY PROCESSING

(75) Inventors: Scott Anthony Exton, Ormeau Hills (AU); Davin John Holmes, Southport (AU); Stephen Viselli, Southport (AU); Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 13/071,582

(22) Filed: Mar. 25, 2011

(65) Prior Publication Data

US 2012/0246312 A1     Sep. 27, 2012

(51) Int. Cl.
*G06F 15/16* (2006.01)
*G06F 15/173* (2006.01)

(52) U.S. Cl.
USPC ............... 709/225; 709/223; 709/246; 726/5; 726/9; 726/18; 726/20

(58) Field of Classification Search ................ 726/5, 9, 726/18, 20; 709/223, 225, 246
See application file for complete search history.

(56) References Cited

U.S. PATENT DOCUMENTS

| 7,222,363 | B2 | 5/2007 | Rice et al. ............... 726/5 |
| 7,702,917 | B2 | 4/2010 | Tevosyan et al. ........ 713/185 |
| 8,078,870 | B2 * | 12/2011 | Nanda et al. ............ 713/166 |
| 8,156,549 | B2 | 4/2012 | Rice et al. ............... 726/9 |
| 2005/0223413 | A1 * | 10/2005 | Duggan et al. .......... 726/3 |
| 2006/0112422 | A1 * | 5/2006 | Tevosyan et al. ........ 726/9 |
| 2007/0226785 | A1 | 9/2007 | Chow et al. ............. 726/8 |
| 2008/0301784 | A1 | 12/2008 | Zhu et al. ............... 726/5 |
| 2010/0146612 | A1 | 6/2010 | Toomey .................. 726/9 |
| 2010/0154046 | A1 | 6/2010 | Liu et al. ................ 726/8 |
| 2010/0293385 | A1 | 11/2010 | Nanda et al. ............ 713/136 |

FOREIGN PATENT DOCUMENTS

WO    WO 2008/130760 A1    10/2008

OTHER PUBLICATIONS

"Brokered Authentication: Security Token Service (STS)," Microsoft Corporation, Dec. 2005.
Bustamante, "Build A Security Token Service (STS) with the Geneva Framework," Microsoft Corporation, Jan. 2009.
"Configuring the identity service file for STS mapping," IBM Corporation, Apr. 2010. Guilhen, "PicketLink Security Token Service," JBoss Community, May 2009.
International Search Report for PCT/CA2012/050181 (filed Mar. 23, 2012), mailed Aug. 17, 2012, 3 pages.

* cited by examiner

*Primary Examiner* — Aaron Strange
(74) *Attorney, Agent, or Firm* — VanLeeuwen & VanLeeuwen; Jeffrey S. LaBaw

(57) ABSTRACT

An approach is provided where an HTTP request is received and a Request for Security Token (RST) is created. Parameters are selected from the request and mappings are retrieved corresponding to the parameters. Context attributes are created in the RST corresponding to the parameters. A context attribute type value is set based on an HTTP section where the parameter is located within the HTTP request. The RST is sent to a security token service for processing. In another approach, a Request Security Token Response (RSTR) is received and an HTTP response is created. RSTR parameters are selected and parameter mappings are retrieved corresponding to the selected RSTR parameters from a mapping table with a TYPE value being identified based on the retrieved parameter mapping. Context attributes are added to the HTTP response based on the identified TYPE values. The HTTP response is transmitted to a remote computer system.

25 Claims, 7 Drawing Sheets

HTTP request message:

```
GET /path?name=value HTTP/1.1
Host: example.com
Content-Type: application/x-www-form-urlencoded
a=1&b=2
```
600

*FIG. 6*

Request for Security Token (RST) 605

Trust message with attributes:

```
<attribute name="method" type="urn:source:http:request">
  <value>GET</value>
</attribute>
<attribute name="path" type="urn:source:http:request">
  <value>/path</value>
</attribute>
<attribute name="scheme" type="urn:source:http:request">
  <value>HTTP/1.1</value>
</attribute>
<attribute name="host" type="urn:source:http:request">
  <value>example.com</value>
</attribute>
```
610

Header attributes represented as follows:

```
<attribute name="Content-Type" type="urn:source:http:request:header">
  <value>application/x-www-form-urlencoded</value>
</attribute>
```
620

Query string broken down into name-value pairs and an RST element is added for each as represented below:

```
<attribute name="name" type="urn:source:http:request:query">
  <value>value</value>
</attribute>
```
630

If the post body is URL encoded, it is broken down into name-value pairs and a RST element is added for each as represented below:

```
<attribute name="a" type="urn:source:http:request:body">
  <value>1</value>
</attribute>
<attribute name="b" type="urn:source:http:request:body">
  <value>2</value>
</attribute>
```
640

FIG. 7

HTTP Request Example:

```
GET /path?name=value HTTP/1.1                    700
Host: example.com
Content-Type: application/x-www-form-urlencoded
a=1&b=2
```

Resulting RST transformed from HTTP:

```xml
<soapenv:Envelope xmlns:soapenv="http://schemas.xmlsoap.org/soap/envelope/"     710
    xmlns:soapenc="http://schemas.xmlsoap.org/soap/encoding/"
    xmlns:xsd="http://www.w3.org/2001/XMLSchema"
    xmlns:xsi="http://www.w3.org/2001/XMLSchema-instance"
    xmlns:wsa="http://schemas.xmlsoap.org/ws/2004/08/addressing"
    xmlns:wst="http://schemas.xmlsoap.org/ws/2005/02/trust"
    xmlns:wsp="http://schemas.xmlsoap.org/ws/2004/09/policy"
    xmlns:stsuuser="urn:ibm:names:ITFIM:1.0:stsuuser">
    <soapenv:Header/>
    <soapenv:Body>
        <wst:RequestSecurityToken>
            <wst:RequestType>http://schemas.xmlsoap.org/ws/2005/02/trust/Validate
</wst:RequestType>
            <wst:Issuer>
                <wsa:Address>urn:issuer:http:client</wsa:Address>
            </wst:Issuer>
            <wsp:AppliesTo>
                <wsa:EndpointReference>
                    <wsa:Address></wsa:Address>
                </wsa:EndpointReference>
            </wsp:AppliesTo>
            <wst:Base>
                <stsuuser:STSUniversalUser>
                    <stsuuser:Principal />
                    <stsuuser:AttributeList/>
                    <stsuuser:ContextAttributes>             720
                        <stsuuser:Attribute name="method" type="urn:source:http:request">
                            <stsuuser:Value>GET</stsuuser:Value>
                        </stsuuser:Attribute>
                        <stsuuser:Attribute name="scheme" type="urn:source:http:request">
                            <stsuuser:Value>HTTP/1.1</stsuuser:Value>
                        </stsuuser:Attribute>
                        <stsuuser:Attribute name="host" type=" urn:source:http:request">
                            <stsuuser:Value>example.com</stsuuser:Value>
                        </stsuuser:Attribute>
                        <stsuuser:Attribute name="path" type=" urn:source:http:request">
                            <stsuuser:Value>/path</stsuuser:Value>
                        </stsuuser:Attribute>
                        <stsuuser:Attribute name="Content-Type" type=" urn:source:http:request:header">
<stsuuser:Value>x-www-form-urlencoded</stsuuser:Value>
                        </stsuuser:Attribute>
                        <stsuuser:Attribute name="name" type=" urn:source:http:request:query">
                            <stsuuser:Value>value</stsuuser:Value>
                        </stsuuser:Attribute>
                        <stsuuser:Attribute name="a" type=" urn:source:http:request:body">
                            <stsuuser:Value>1</stsuuser:Value>
                        </stsuuser:Attribute>
                        <stsuuser:Attribute name="b" type=" urn:source:http:request:body">
                            <stsuuser:Value>2</stsuuser:Value>
                        </stsuuser:Attribute>
                    </stsuuser:ContextAttributes>
                </stsuuser:STSUniversalUser>
            </wst:Base>
        </wst:RequestSecurityToken>
    </soapenv:Body>
</soapenv:Envelope>
```

TRANSFORMING HTTP REQUESTS INTO WEB SERVICES TRUST MESSAGES FOR SECURITY PROCESSING

BACKGROUND

The present invention relates to an approach that transforms Hypertext Transfer Protocol (HTTP) requests into Web services trust messages so that they can be processed (consumed) by a Web Services Trust (WS-Trust) Security Token Service (STS).

A large amount of computer network traffic uses HTTP to transport requests between computer systems. In addition, HTTP requests are also used to transport security information by appending parameters used to make authorization decisions to one or more parts of the HTTP message, such as to the header, body, or query component. Security token service applications, however, are designed to process and make authorization decisions based on Web Services Trust (WS-Trust) messages rather than HTTP requests. A challenge exists therefore in providing data included in HTTP requests to these security token service applications.

BRIEF SUMMARY

According to one disclosed embodiment, an approach is provided in which an HTTP request is received and a Request for Security Token (RST) is created with the RST corresponding to the HTTP request. Parameters are selected from the HTTP request and parameter mappings are retrieved corresponding to each of the selected parameters from a mapping table. Context attributes are created in the Request Security Token that correspond to each of the selected parameters. A context attribute type value is set corresponding to the created context attributes with the type value being based on an HTTP section where the parameter is located within the HTTP request. The resulting RST is then sent to a security token service for processing.

According to another disclosed embodiment, a Request Security Token Response (RSTR) is received and an HTTP response is created based on the RSTR. RSTR parameters are selected from the received RSTR. Parameter mapping are retrieved corresponding to the selected RSTR parameters from a mapping table with a TYPE value being identified based on the retrieved parameter mapping. HTTP context attributes are added in the HTTP response based on the identified TYPE values. The resulting HTTP response is transmitted to a remote computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein:

FIG. 6 shows a first example transformation of an HTTP request message to an RST; and FIG. 7 shows a second example transformation of an HTTP request message to an RST.

DETAILED DESCRIPTION

Figure 1:
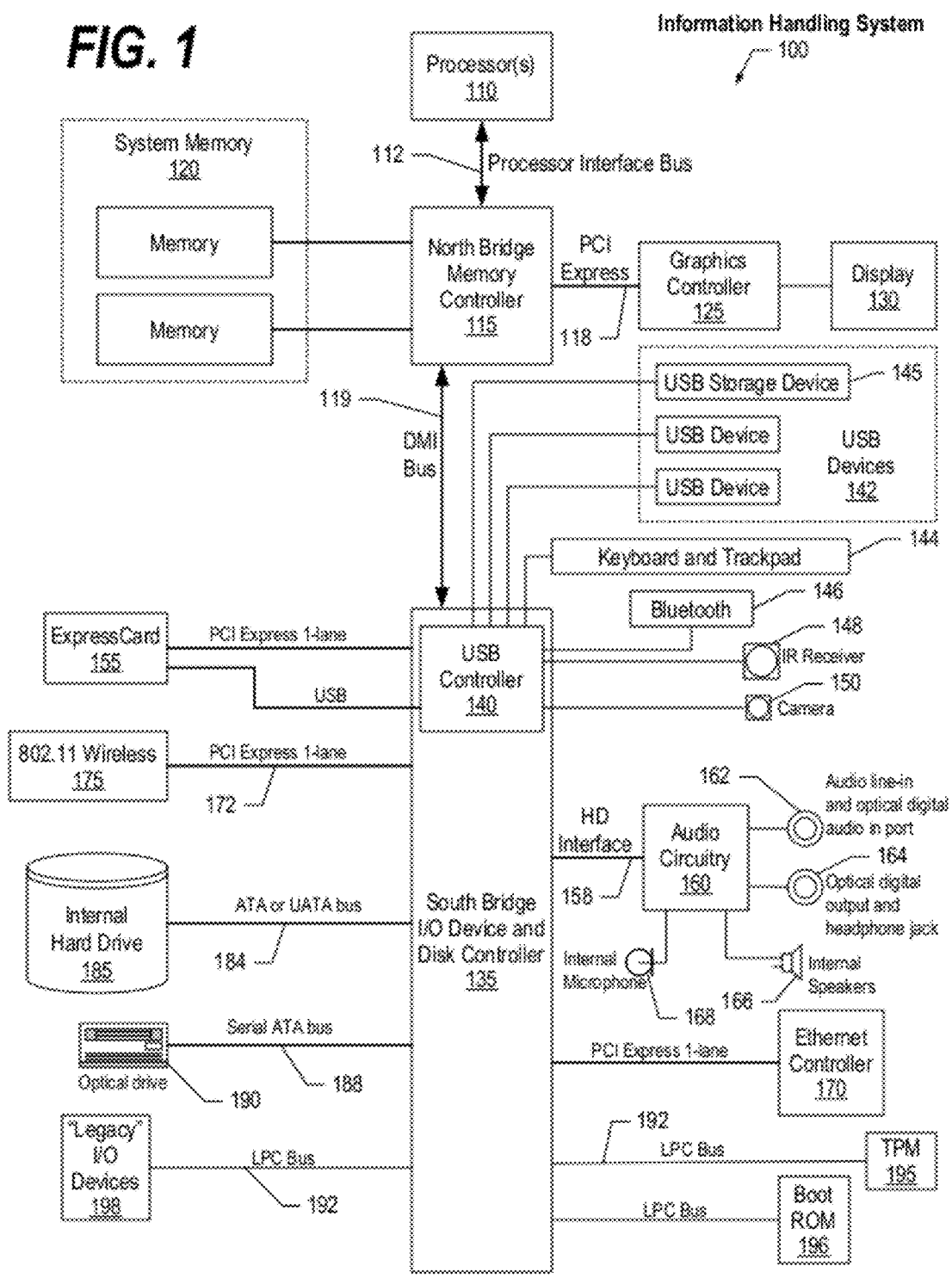
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
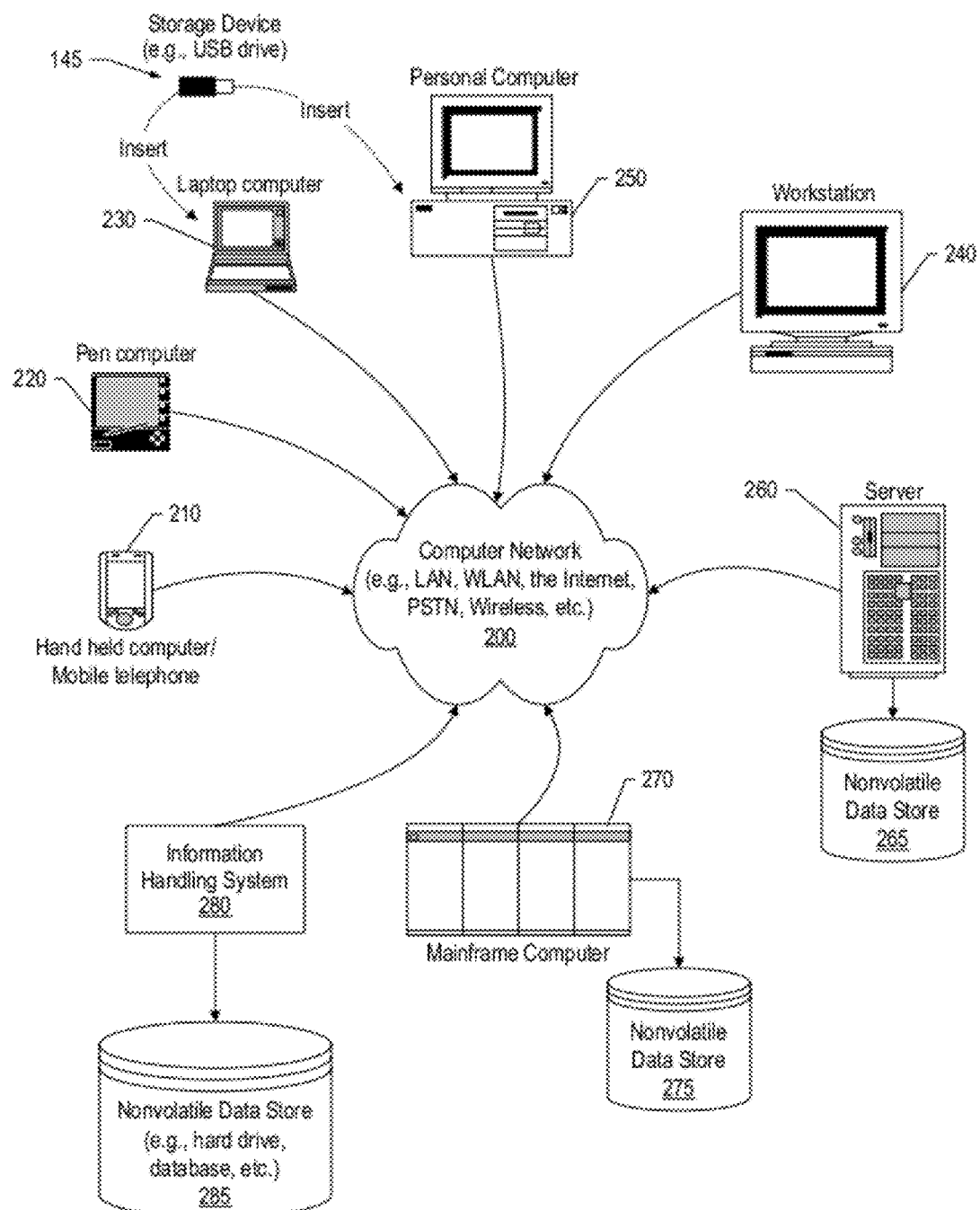
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280.

As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
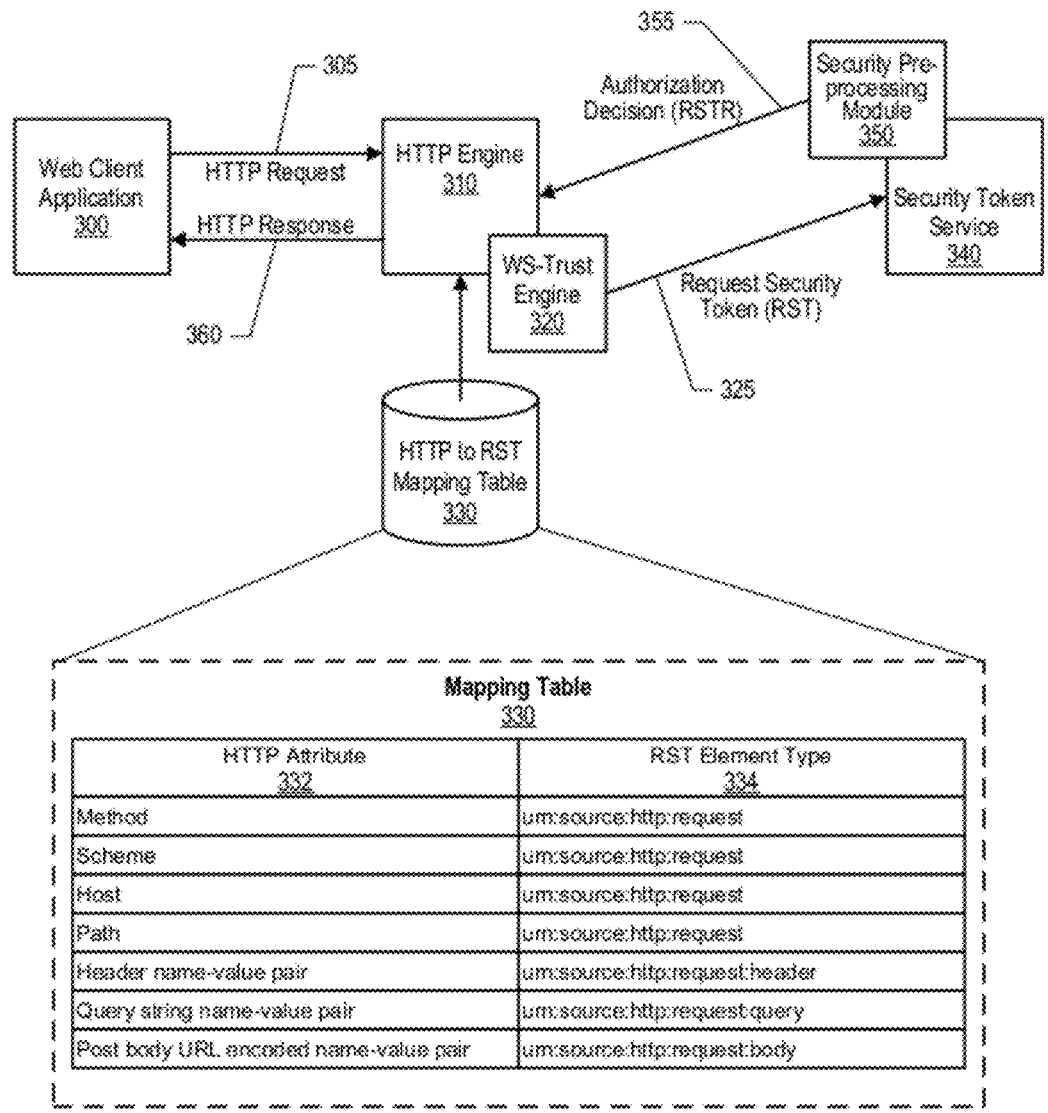
FIG. 3 is a component diagram showing components used in handling a client Hypertext Transfer Protocol (HTTP) request and mapping it to a Request Security Token (RST)

FIG. 3 is a component diagram showing components used in handling a client Hypertext Transfer Protocol (HTTP) request and mapping it to a Request Security Token (RST). Web client application 300 (the requestor) sends HTTP request 305 to HTTP engine 310, such as a software application used by a Web site to handle HTTP requests and responses. Web client application 300 (the requestor) is a remote computer system from HTTP engine 310 (the Web site) with the client application and HTTP engine communicating with each other by sending requests and responses to each other over a computer network, such as the Internet. HTTP engine 310 utilizes Web Services Trust (WS-Trust) engine 320 which is a software application used for security processing purposes. HTTP engine 310 or, in some embodiments, WS-Trust engine 320, transforms the HTTP request into Request Security Token (RST) 325 using mapping table 330. Mapping table 330 includes HTTP attributes 332 and their corresponding RST element types 334. HTTP engine 320 (or WS-Trust engine 320) retrieves the mapping information to map the HTTP attributes (parameters) included in HTTP request 305 into RST context attributes that are included in RST 325. The individual attributes of HTTP request 305 are extracted and mapped to a WS-Trust message as individual RequestSecurityToken (RST) elements. Standard HTTP protocol attributes are named after their HTTP protocol defined attribute names (for example, method, scheme, host), while name-value pairs found in HTTP headers, the query string component of the HTTP URI, or the post body are named after their parameter name. The source of the attribute (the source being the location of the attribute within the HTTP request) is also identified in the WS-Trust message by the type attribute of the RST elements. As shown in mapping table 330, standard HTTP protocol attributes (for example, method, scheme, host) are assigned the type "request", while name-value pairs are assigned a type relating to their location within the HTTP request (for example, "query", "header", "body"). FIGS. 6 and 7 provide examples of HTTP requests transformed into RSTs.

Once the RST is created, based on mapping the HTTP parameters to RST context attributes, the resulting RST is sent to security token service 340 for security processing. Security token service 340 makes an authorization decision based on the data included in RST 325. In one embodiment, the security token service utilizes security pre-processing module 350 to send the authorization decision in Request Security Token Response (RSTR) 355. Once again, either HTTP engine 310 or WS-Trust engine 320 utilizes mapping table 330, this time to map RSTR 355 received from the security token service to HTTP context attributes based on the TYPE values included in the RSTR. This "reverse" mapping is used to create HTTP response 360 which includes the HTTP context attributes. Once created, HTTP engine 310 transmits HTTP response 360 back to Web client application 300 (the requestor) over the computer network, such as the Internet.

Figure 4:
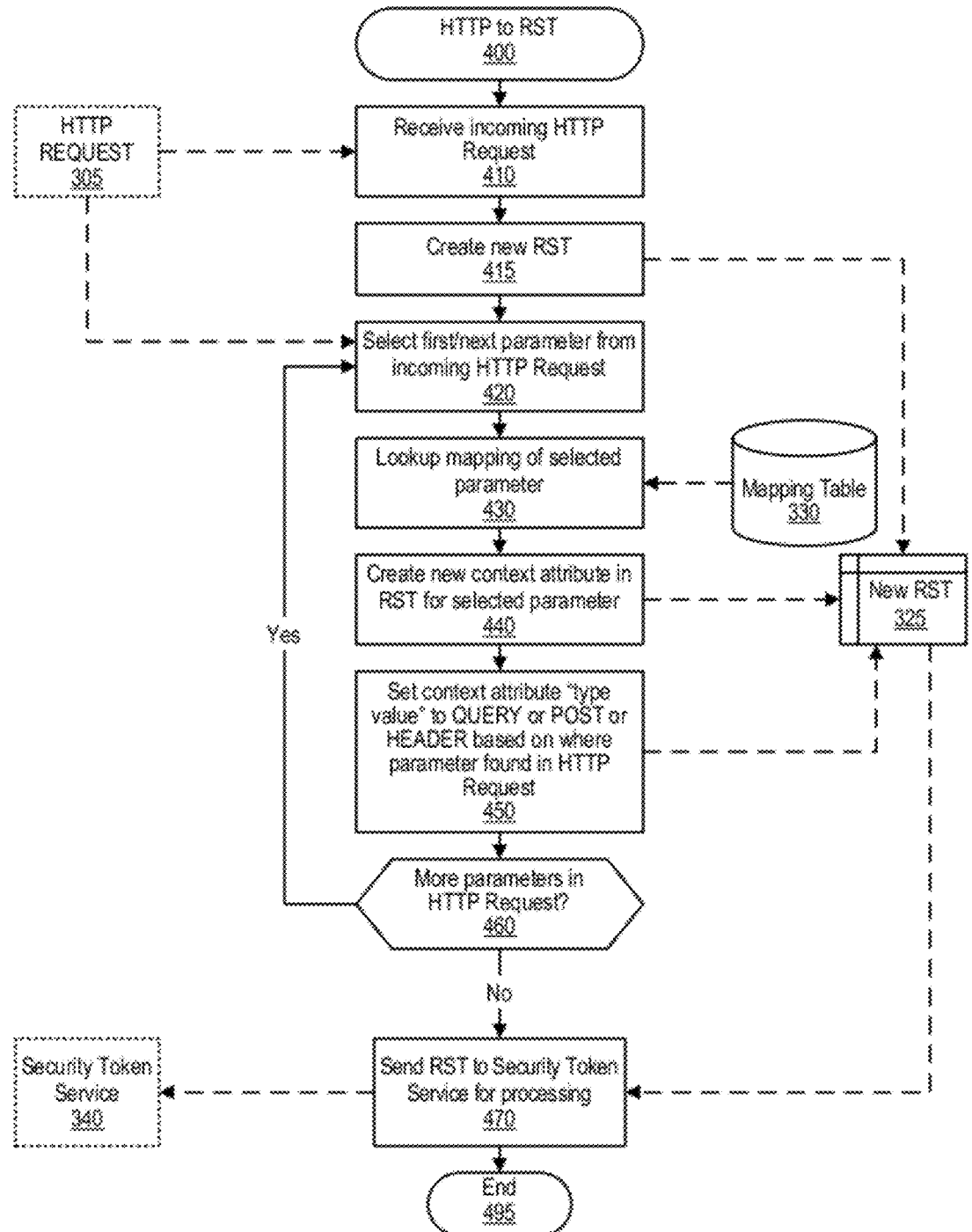
FIG. 4 is a flowchart showing steps taken to transform an HTTP request to an RST token.

FIG. 4 is a flowchart showing steps taken to transform an HTTP request to an RST token. Processing commences at 400 whereupon, at step 410 an incoming HTTP request 305 is received from a remote computer system, such as a client's Web application. HTTP request 305 is stored in a memory area for processing. At step 415, the process creates a new Request Security Token (RST) in another memory area (new RST created in memory area 325). Now the parameters included in HTTP request 305 are processed to fully create the new RST.

At step 420, the first parameter is selected from HTTP request 305. At step 430, a search is made for the selected parameter in mapping table 330 (see FIG. 3 for a detailed view of the mapping table). At step 440, a new context attribute is created in RST 325 corresponding to the selected parameter from the HTTP request. At step 450, a context attribute "type value" is set in the RST based upon where (which section) the corresponding parameter was found in the HTTP request. The type value is set to a value such as QUERY, POST, or HEADER based on the section (e.g., query section, header section, body section, etc.) within the HTTP request where the parameter was found. The type value is added to the context attribute in RST 325.

A decision is made as to whether there are more parameters in the HTTP request that need to be processed (decision 460). If there are more parameters to process, then decision 460 branches to the "yes" branch which loops back to select and process the next parameter as described above. This looping continues until all of the parameters that need to be processed from the HTTP request have been processed, at which point decision 460 branches to the "no" branch. After all of the parameters in the HTTP request have been processed, then, at step 470, the completed RST is sent to security token service 340 for an authorization decision (e.g., whether the client requestor will be granted access, etc.). Processing thereafter ends at 495.

Figure 5:
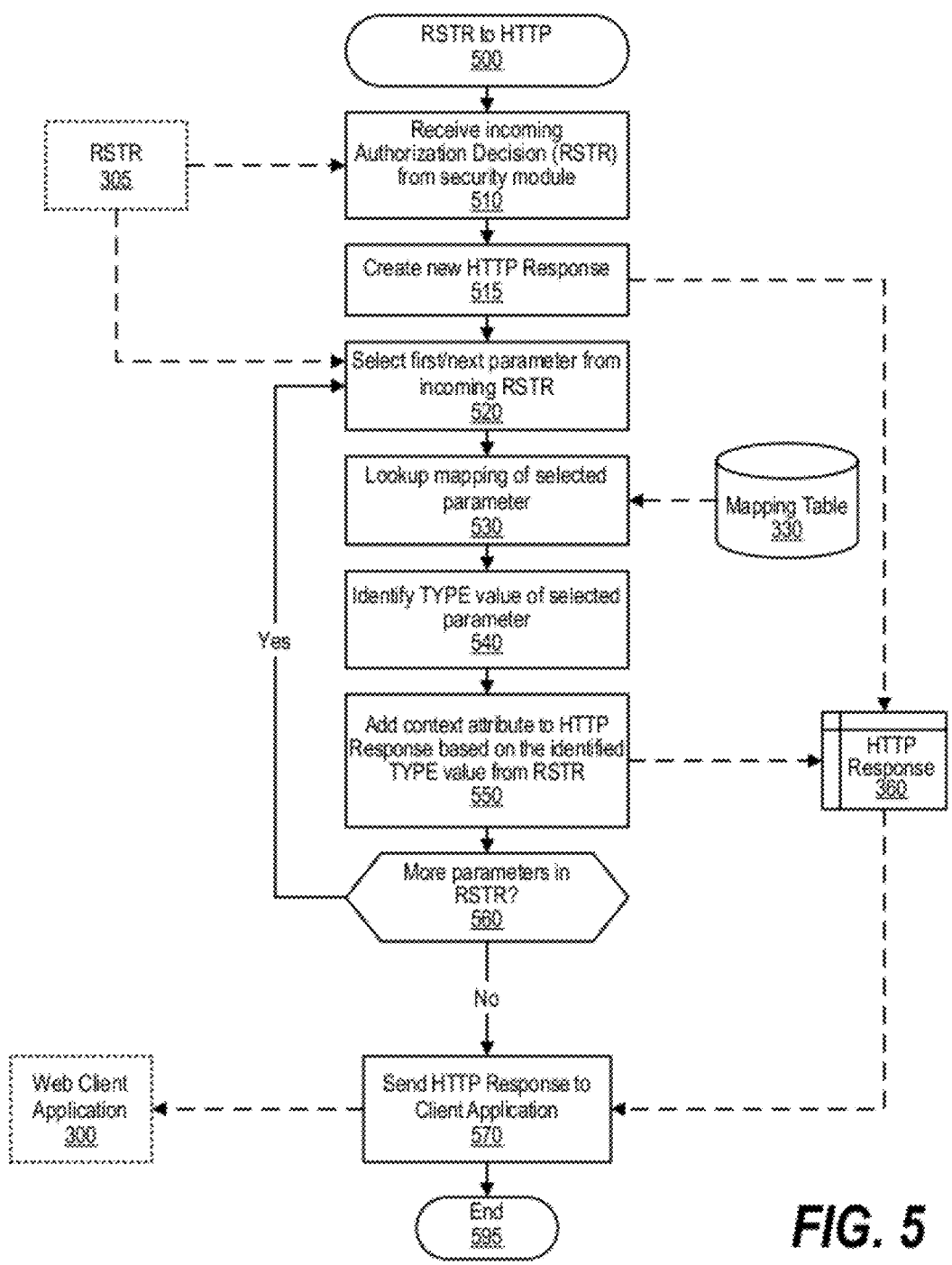
FIG. 5 is a flowchart showing steps taken to transform a Request Security Token Response (RSTR) from a security application back to an HTTP response.

FIG. 5 is a flowchart showing steps taken to transform a Request Security Token Response (RSTR) from a security application back to an HTTP response. Processing commences at 500 whereupon, at step 510, an authorization decision (Request Security Token Response (RSTR) 305) is received from a security module that was utilized for the authorization decision. At step 515, a new HTTP response (HTTP response 360) is created in a memory area. Now the parameters included in the RSTR are processed in order to create the HTTP response.

At step 520, the first parameter is selected from the incoming RSTR 305. At step 530, a search is made for the selected parameter in mapping table 330 (see FIG. 3 for a detailed view of the mapping table). Based on the search, a TYPE value of the selected parameter is identified at step 540. This TYPE value is used to add context attribute information to the HTTP response based upon the TYPE value from the RSTR. At step 550, the context attribute information is added to HTTP response 360.

A decision is made as to whether there are more parameters in the RSTR that need to be processed (decision 560). If there are more parameters to process, then decision 560 branches to the "yes" branch which loops back to select and process the next parameter from RSTR 305 as described above. This looping continues until all parameters in the RSTR that need to be processed have been processed, at which point decision 560 branches to the "no" branch to exit the loop.

At step 570, the completed HTTP response 360 is transmitted back to requestor 300, such as a Web client application running on a remote computer system. Processing thereafter ends at 595.

FIG. 6 shows a first example transformation of an HTTP request message to an RST. Example HTTP request 600 includes the following details:

```
GET /path?name=value HTTP/1.1
Host: example.com
Content-Type: application/x-www-form-urlencoded
a=1&b=2
```

The resulting example RST 605 includes the following details. First, the HTTP request is transformed into a WS-Trust message that includes the following attributes shown in 610:

```
<attribute name="method" type="urn:source:http:request">
  <value>GET</value>
</attribute>
<attribute name="path" type=" urn:source:http:request ">
  <value>/path</value>
</attribute>
<attribute name="scheme" type=" urn:source:http:request ">
  <value>HTTP/1.1</value>
</attribute>
<attribute name="host" type=" urn:source:http:request ">
  <value>example.com</value>
</attribute>
```

Next, the header attributes are represented in the RST as follows and as shown in 620:

```
<attribute name="Content-Type" type=" urn:source:http:request:header">
  <value>application/x-www-form-urlencoded</value>
</attribute>
```

A query string broken in the HTTP request is down into name-value pairs and an RST element is added for each as represented below and as shown in 630:

```
<attribute name="name" type=" urn:source:http:request:query">
  <value>value</value>
</attribute>
```

Finally, if the post body is URL encoded, it is broken down into name-value pairs and a RST element is added for each as represented below and as shown in 640:

```
<attribute name="a" type=" urn:source:http:request:body">
  <value>1</value>
```

-continued

```
    </attribute>
    <attribute name="b" type=" urn:source:http:request:body">
      <value>2</value>
    </attribute>
```

FIG. 7 shows a second example transformation of an HTTP request message to an RST. In FIG. 7, the transformation as shown and described in FIG. 6 is included along with the complete RST that is generated based on an implementation of the transformation processing. This implementation uses an Security Token Service Universal User (STSUU) token in the RST base with the HTTP attribute elements added to the STSUU context attributes section. Example HTTP request 700 is transformed into resulting example RST 710. Note that section 720 within RST 710 includes the context attributes that were extracted from the HTTP request and transformed to RST context attributes as shown and described in FIG. 6 and corresponding text.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a Hypertext Transfer Protocol (HTTP) request at a network adapter and storing the HTTP request in a first memory area;
   creating a Request Security Token (RST) corresponding to the HTTP request in a second memory area;
   selecting a plurality of parameters from the stored HTTP request;
   retrieving a parameter mapping corresponding to each of the selected plurality of parameters from a mapping table;
   creating a context attribute in the created Request Security Token corresponding to each of the selected plurality of parameters;
   setting a context attribute type value corresponding to one or more of the created context attributes based on an HTTP section where the corresponding parameter is located within the HTTP request; and
   sending the RST with created context attributes and context attribute type values to a security token service.

2. The method of claim 1 wherein the context attribute type value is selected from the group consisting of QUERY, POST, and HEADER.

3. The method of claim 1 wherein the HTTP request is received from a requesting client using a computer network.

4. The method of claim 1 wherein the parameter mapping retrieval further comprises:
   mapping a HTTP "method" attribute identified in one of the parameters to an RST element type of "request";
   mapping a HTTP "scheme" attribute identified in one of the parameters to an RST element type of "request";
   mapping a HTTP "host" attribute identified in one of the parameters to an RST element type of "request";
   mapping a HTTP "path" attribute identified in one of the parameters to an RST element type of "request";
   mapping a HTTP header name-value pair attribute identified in one of the parameters to an RST element type of "header";
   mapping a HTTP query string name-value pair attribute identified in one of the parameters to an RST element type of "query"; and
   mapping a HTTP post body URL encoded name-value pair identified in one of the parameters to an RST element type of "body".

5. The method of claim 1 further comprising:
   receiving a Request Security Token Response (RSTR) from the security token service in response to the sending of the RST;
   creating an HTTP response based on the RSTR; and
   sending the created HTTP response to a requestor that sent the HTTP request.

6. The method of claim 5 further comprising:
   selecting a plurality of RSTR parameters from the received RSTR;
   retrieving the parameter mapping corresponding to each of the selected plurality of RSTR parameters from the mapping table;
   identifying a TYPE value corresponding to each of the selected parameters based on the retrieved parameter mapping; and
   adding a plurality of HTTP context attribute in the HTTP response based on the identified TYPE values.

7. The method of claim 6 further comprising:
   receiving the HTTP request at an HTTP engine associated with a Web site, the request received from the requestor;
   receiving the RSTR at the HTTP engine; and
   sending the HTTP response from the HTTP engine to the requestor.

8. An information handling system comprising:
   one or more processors;
   a memory coupled to at least one of the processors, wherein the memory includes a plurality of memory areas;
   a network adapter that connects the information handling system to a computer network;
   a set of computer program instructions stored in the memory and executed by at least one of the processors in order to perform actions of:
      receiving a Hypertext Transfer Protocol (HTTP) request at the network adapter and storing the HTTP request in a first memory area;
      creating a Request Security Token (RST) corresponding to the HTTP request in a second memory area;
      selecting a plurality of parameters from the stored HTTP request;
      retrieving a parameter mapping corresponding to each of the selected plurality of parameters from a mapping table;

creating a context attribute in the created Request Security Token corresponding to each of the selected plurality of parameters;
setting a context attribute type value corresponding to one or more of the created context attributes based on an HTTP section where the corresponding parameter is located within the HTTP request; and
sending the RST with created context attributes and context attribute type values to a security token service.

9. The information handling system of claim 8 wherein the context attribute type value is selected from the group consisting of QUERY, POST, and HEADER.

10. The information handling system of claim 8 wherein the HTTP request is received from a requesting client using a computer network.

11. The information handling system of claim 8 wherein the parameter mapping retrieval further comprises:
mapping a HTTP "method" attribute identified in one of the parameters to an RST element type of "request";
mapping a HTTP "scheme" attribute identified in one of the parameters to an RST element type of "request";
mapping a HTTP "host" attribute identified in one of the parameters to an RST element type of "request";
mapping a HTTP "path" attribute identified in one of the parameters to an RST element type of "request";
mapping a HTTP header name-value pair attribute identified in one of the parameters to an RST element type of "header";
mapping a HTTP query string name-value pair attribute identified in one of the parameters to an RST element type of "query"; and
mapping a HTTP post body URL encoded name-value pair identified in one of the parameters to an RST element type of "body".

12. The information handling system of claim 8 wherein the processors perform additional actions comprising:
receiving a Request Security Token Response (RSTR) from the security token service in response to the sending of the RST;
creating an HTTP response based on the RSTR; and
sending the created HTTP response to a requestor that sent the HTTP request.

13. The information handling system of claim 12 wherein the processors perform additional actions comprising:
selecting a plurality of RSTR parameters from the received RSTR;
retrieving the parameter mapping corresponding to each of the selected plurality of RSTR parameters from the mapping table;
identifying a TYPE value corresponding to each of the selected parameters based on the retrieved parameter mapping; and
adding a plurality of HTTP context attribute in the HTTP response based on the identified TYPE values.

14. The information handling system of claim 13 wherein the processors perform additional actions comprising:
receiving the HTTP request at an HTTP engine associated with a Web site, the request received from the requestor;
receiving the RSTR at the HTTP engine; and
sending the HTTP response from the HTTP engine to the requestor.

15. A computer program product stored in a computer readable storage medium, comprising computer program code that, when executed by an information handling system, causes the information handling system to perform actions comprising:

receiving a Hypertext Transfer Protocol (HTTP) request at a network adapter and storing the HTTP request in a first memory area;
creating a Request Security Token (RST) corresponding to the HTTP request in a second memory area;
selecting a plurality of parameters from the stored HTTP request;
retrieving a parameter mapping corresponding to each of the selected plurality of parameters from a mapping table;
creating a context attribute in the created Request Security Token corresponding to each of the selected plurality of parameters;
setting a context attribute type value corresponding to one or more of the created context attributes based on an HTTP section where the corresponding parameter is located within the HTTP request; and
sending the RST with created context attributes and context attribute type values to a security token service.

16. The computer program product of claim 15 wherein the context attribute type value is selected from the group consisting of QUERY, POST, and HEADER.

17. The computer program product of claim 15 wherein the HTTP request is received from a requesting client using a computer network.

18. The computer program product of claim 15 wherein the parameter mapping retrieval further comprises:
mapping a HTTP "method" attribute identified in one of the parameters to an RST element type of "request";
mapping a HTTP "scheme" attribute identified in one of the parameters to an RST element type of "request";
mapping a HTTP "host" attribute identified in one of the parameters to an RST element type of "request";
mapping a HTTP "path" attribute identified in one of the parameters to an RST element type of "request";
mapping a HTTP header name-value pair attribute identified in one of the parameters to an RST element type of "header";
mapping a HTTP query string name-value pair attribute identified in one of the parameters to an RST element type of "query"; and
mapping a HTTP post body URL encoded name-value pair identified in one of the parameters to an RST element type of "body".

19. The computer program product of claim 15 wherein the information handling system performs further actions comprising:
receiving a Request Security Token Response (RSTR) from the security token service in response to the sending of the RST;
creating an HTTP response based on the RSTR; and
sending the created HTTP response to a requestor that sent the HTTP request.

20. The computer program product of claim 19 wherein the information handling system performs further actions comprising:
selecting a plurality of RSTR parameters from the received RSTR;
retrieving the parameter mapping corresponding to each of the selected plurality of RSTR parameters from the mapping table;
identifying a TYPE value corresponding to each of the selected parameters based on the retrieved parameter mapping; and
adding a plurality of HTTP context attributes in the HTTP response based on the identified TYPE values.

21. The computer program product of claim 20 wherein the information handling system performs further actions comprising:
- receiving the HTTP request at an HTTP engine associated with a Web site, the request received from the requestor;
- receiving the RSTR at the HTTP engine; and
- sending the HTTP response from the HTTP engine to the requestor.

22. A method comprising:
- receiving a Request Security Token Response (RSTR) and storing the Request Security Token Response in a first memory area;
- creating an HTTP response based on the Request Security Token Response;
- selecting a plurality of RSTR parameters from the received Request Security Token Response;
- retrieving a parameter mapping corresponding to each of the selected plurality of RSTR parameters from a mapping table that is stored in a second memory area;
- identifying a TYPE value corresponding to each of the selected RSTR parameters based on the retrieved parameter mapping;
- adding a plurality of HTTP context attributes in the HTTP response based on the identified TYPE values; and
- transmitting the HTTP response over a computer network utilizing a network adapter, wherein the HTTP response is addressed to a remote computer system.

23. The method of claim 22 wherein the parameter mapping retrieval further comprises:
- mapping an RST element type of "header" identified in one of the RSTR parameters to a HTTP header name-value pair attribute;
- mapping an RST element type of "query" identified in one of the RSTR parameters to a HTTP query string name-value pair attribute; and
- mapping an RST element type of "body" identified in one of the RSTR parameters to a HTTP post body URL encoded name-value pair.

24. The method of claim 22 further comprising:
- prior to receiving the Request Security Token Response, sending a Request for Security Token (RST) to a security token service, wherein the Request Security Token Response is received from the security token service in response to the sending of the Request for Security Token.

25. The method of claim 24 further comprising:
- receiving an HTTP request from the remote computer system prior to sending the Request for Security Token to the security token service; and
- transforming the HTTP request to the Request for Security Token that is sent to the security token service.

* * * * *